United States Patent
Dove et al.

(10) Patent No.: US 6,953,004 B2
(45) Date of Patent: Oct. 11, 2005

(54) SEASONING RECOVERY AND RECYCLE (75) Inventors: Kathryn Melissa Dove, Plano, TX (US); Ponnattu Kurian Joseph, Irving, TX (US); Donald Joe Tatsch, Tioga, TX (US); Mehrnaz Vafaie, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 10/285,895

(22) Filed: Nov. 1, 2002

(65) Prior Publication Data
US 2004/0083901 A1 May 6, 2004

(51) Int. Cl.[7] ............................................. A23G 3/20
(52) U.S. Cl. ..................... 118/13; 118/19; 118/600; 118/602; 118/308; 99/494; 426/289; 426/295
(58) Field of Search ..................... 118/13, 19, 600, 118/602, 308, 417, 418; 99/494; 426/289, 295

(56) References Cited

U.S. PATENT DOCUMENTS

| | | |
|---|---|---|
| 2,893,332 A * | 7/1959 | Roser et al. ............... 426/294 |
| 3,152,010 A | 10/1964 | Case |
| 3,608,474 A | 7/1969 | Liepa |
| 3,576,647 A | 4/1971 | Liepa |
| 3,635,326 A | 1/1972 | Langlinais |
| 4,270,486 A | 6/1981 | Leverenz |
| 4,419,953 A | 12/1983 | Fowler |
| 4,543,907 A | 10/1985 | Fowler |
| 4,576,108 A | 3/1986 | Socola et al. |
| 4,597,358 A | 7/1986 | Aitken |
| 4,614,162 A | 9/1986 | Ryan et al. |
| 4,907,720 A | 3/1990 | Henson et al. |
| 5,090,593 A | 2/1992 | Ejike |
| 5,386,939 A | 2/1995 | Ruegg |
| 5,707,448 A | 1/1998 | Cordera et al. |
| 5,846,324 A | 12/1998 | Marshall et al. |

* cited by examiner

*Primary Examiner*—Laura Edwards
(74) *Attorney, Agent, or Firm*—Colin P. Cahoon; Carstens, Yee & Cahoon, L.L.P.

(57) ABSTRACT

Seasoning for use with snack chips can be recovered and recycled. A seasoning permeable conveyor transports snack chips through a seasoning application. The seasoning applicator deposits seasoning onto the snack chips. The conveyor allows the seasoning not adhered to the moving snack chips to substantially pass through and by toward a seasoning recoverer. The seasoning recoverer, which is positioned beneath the conveyor, collects the seasoning for purification and blending with fresh seasoning. After blending, the seasoning mixture is transported to the seasoning application for use.

27 Claims, 5 Drawing Sheets

SEASONING RECOVERY AND RECYCLE

BACKGROUND OF THE INVENTION

1. Technical Field

The present invention relates to an apparatus and process for recovering and recycling seasoning that is used to flavor snack food products. More particularly, the invention relates to an apparatus and process for recovering and recycling seasoning wherein the seasoning is recovered and purified so that it may be reapplied.

2. Description of Related Art

Snack food products, particularly seasoned snacks chips, are eaten and enjoyed by consumers. For example, potato chips, tortilla chips, corn chips, and the like often include one or more seasonings added to the snack chips after cooking but prior to packaging. To season, snack chips are typically seasoned by sprinkling one or more seasonings onto the surface of the chip products. The surfaces of the chips after seasoning provide a desirable and interesting appearance and immediate flavor to the palate upon consumption. Some common seasonings that consumers prefer, for example, include salt, barbecue flavor, sour cream and onion flavor, vinegar flavor, cheese, and others. Some of these seasonings are hydroscopic and readily absorb oil.

Seasoning is typically coated onto the surface of chips after cooking. Typically, this is advantageous in that after cooking, particularly with frying, the surface of the chips retain a surface coating of oil and are hot. When the powdered seasoning is deposited onto the exterior surface of the chips, a portion of the seasoning powder is retained.

Present techniques for distributing seasoning onto snack chips include tumbling the chips in a rotating cylindrical drum containing seasoning and sprinkling seasoning onto chips as they pass under a seasoning applicator. For example, with a rotating cylindrical drum, unseasoned snack chips enter the drum at an elevated end through a funnel. Seasoning is fed through a dispenser into an interior portion of the drum so as to coat the rotating chips. Internal baffles lift and tumble the chips to promote even coverage of seasoning as the chips are drawn toward the bottom of the drum via gravity. Thereafter, seasoned chips exit the drum and are packaged.

An alternative technique for applying seasoning to snack chips uses a conveyor. Snack chips after cooking are deposited onto a conveyor belt and are transported so as to pass beneath a seasoning applicator. As chips pass through a seasoning curtain, seasoning adheres to the surfaces of the chips that are exposed to the seasoning curtain. Seasoning that does not become affixed to chips is typically discarded because the seasoning, if reused, has adsorbed oil from coming in contact with the fried chips.

While devices such as a rotating drum are more efficient for seasoning, this is not practical for certain snack chip products. Particularly with the manufacture of a uniformly shaped snack chips, randomizing seasoning techniques such as the rotating drum are impractical if packaging includes piling chips in a juxtaposed arrangement into a container. It is more efficient to leave chips in established rows and columns on a conveyor assembly. To rearrange the chips after tumbling in a drum would be expensive and inefficient.

These arrangements, and others, however, produce a significant amount of waste seasoning. Seasoning that does not adhere to surfaces of the chips cannot generally be reused. This is because the seasoning gets conglomerated with oil, moisture, and air from the processing of chips. This leads to changes in density of the seasoning, flowability, seasoning oxidation, and flavor reductions or alterations. Therefore, recycling of seasoning to date is difficult, expensive, and problematic. Also, exposure of the seasoning to the manufacturing process conditions increases the likelihood of microbiological growth.

Therefore, seasoning that does not adhere to snack chips is preferably collected and discarded. This non-adhered seasoning, however, comprises a significant amount of dust, which has a tendency to drift into and throughout the manufacturing facility. This presents additional expenses in that this dust must be collected, these areas need to be cleaned more frequently, and additional ventilation and/or other safety devices must be utilized to reduce health risks.

Consequently, a need exists for a seasoning apparatus and process that provides adequate seasoning coverage onto snack chips while improving processing efficiency and economics. These are particularly needed for seasoning applications where it is advantageous to have the chips remain on a conveyor in uniform rows and columns.

SUMMARY OF THE INVENTION

An exemplary embodiment of the invention is for a seasoning recovery and recycle apparatus and process. The apparatus and process includes elements and steps for reclaiming seasoning and for applying the reclaimed seasoning blended with fresh seasoning onto food products, such as snack chips in particular. Snack chips, preferably coming from a cooking area such as a fryer, are conveyed toward a seasoning application. The conveyor is pervious to seasoning so that seasoning that does not adhere onto moving chips passes, at least in part, through the conveyor. Preferably, the conveyor comprises a series of round cords that are disposed in parallel and operate concurrently. The cords comprise suitable material such as polyurethane. Each snack chip rests on at least two cords, or a single cord with a saddle-like carrier, often with space between the cords disposed beneath each chip. The cords of each series operate so that between each set of cords there is a smaller set of transfer cords. The transfer cords allow the snack chips to be conveyed forward while minimizing the conveyance forward of oil and other extraneous matter.

The snack chips are then passed through a seasoning application for coating. Preferably, this coating occurs in a controlled environment to help preserve the quality and flowability of the seasoning. A seasoning applicator, such as a vibratory feeder, produces a curtain of seasoning from above the conveyor. The seasoning that is not adhered onto the snack chips substantially passes through and by the conveyor for recovery.

Seasoning is recovered on a surface beneath the conveyor such as a vibratory shelf or rotating belt. The recovered seasoning is then delivered to a sifting device such as a rotary sifter. Fresh seasoning to replenish used seasoning is added to the system, preferably at the entrance of the rotary sifter. The rotary sifter blends and purifies the fresh and recovered seasoning to produce blended seasoning.

Blended seasoning is thereafter transported to the seasoning applicator for application onto snack chips. Preferably, the transport of blended seasoning utilizes a pneumatic dense phase transport which preserves the blending and physical properties of the blended seasoning. A vacuum receiver receives the blended seasoning from the transport and directs it to the seasoning applicator. Thereby, blended seasoning can be applied onto a moving monolayer of snack chips efficiently and economically.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIGS. 2A and 2B are partial top perspective views of an embodiment of a chip conveyor assembly located prior to chip seasoning for use with the apparatus and method of FIG. 1 along line 2—2 showing chip transfer from one segment of the conveyor assembly to another, wherein FIG. 2A shows the conveyor without snack chips and 2B shows the conveyor with snack chips;

DETAILED DESCRIPTION

A seasoning recovery and recycle apparatus and process in accordance with an exemplary embodiment of the invention generally reclaims seasoning that is not retained by snack chips. Further, the apparatus and procedure described herein is unlike others in that it can recover difficult seasonings that easily clumps or otherwise degrades. Commonly, snack chip products, such as potato chips, corn chips, tortilla chips, or the like, are seasoned with salt and other flavorings prior to being packaged for sale to consumers. With the apparatus and process described herein, the residual seasoning is collected and purified for reapplication onto snack chips.

Figure 1:
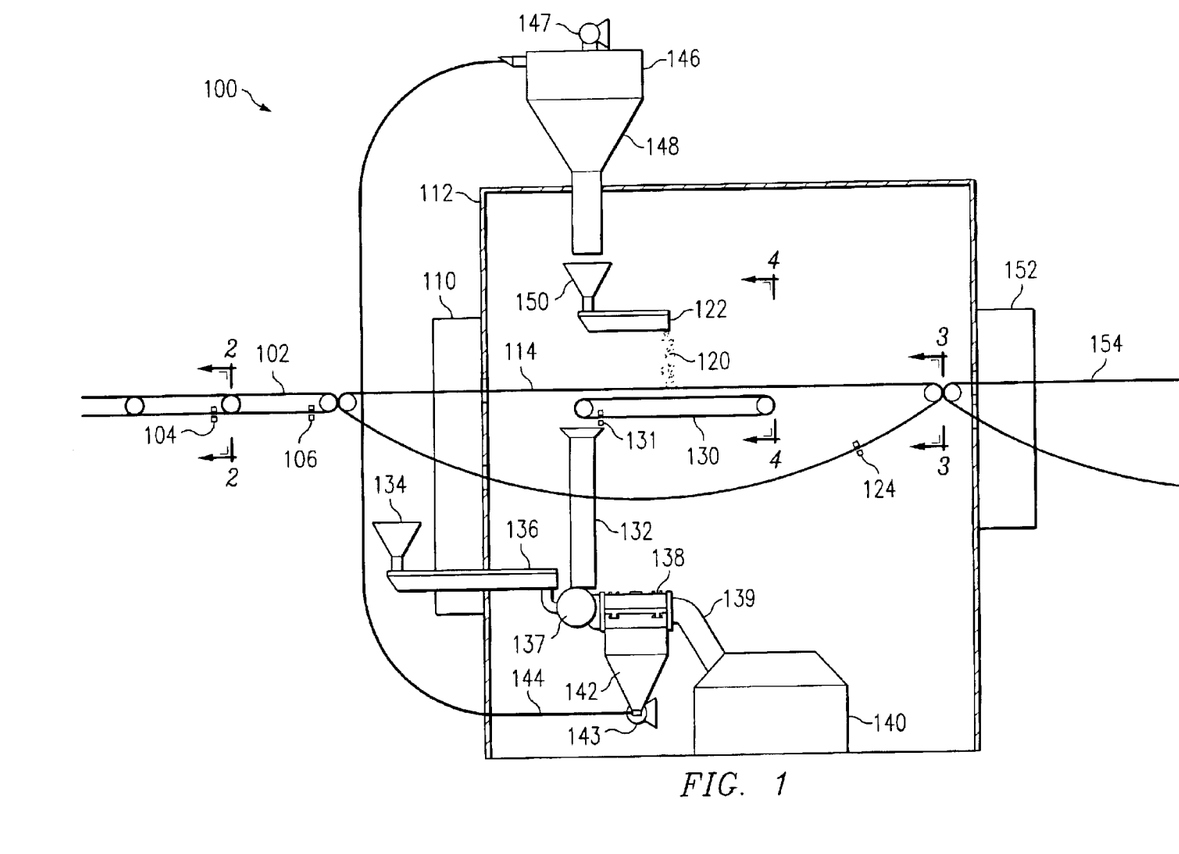
FIG. 1 is a schematic side elevational view of an apparatus and procedure for recovering and recycling seasoning in accordance with the invention.

FIG. 1 shows a schematic representation of the invention wherein applied seasoning that does not adhere to snack chips is reclaimed for reapplication. Seasoning system 100 comprises an example of an assembly for seasoning snack chips, particularly potato chips, having generally three sections. The first section is a pre-seasoning area where snack chips are transported from a cooking area toward the seasoning area. The second section is the seasoning area where seasoning is applied onto passing snack chips. Lastly, the third section is a post-seasoning area where seasoned snack chips are transported from the seasoning area toward product packaging.

With seasoning system 100, cooked snack chips are directed toward seasoning on a feeding conveyor 102. In a preferred embodiment, feeding conveyor 102 is designed to minimize the feeding forward of any extraneous matter such as oil, broken chip pieces, or other undesired materials toward the seasoning area. This is particularly useful because reducing or eliminating extraneous matter from entering the seasoning area improves seasoning efficiency. Seasoning efficiency is the proportion of the amount of seasoning retained by snack chips leaving the system compared to the amount of fresh seasoning being added to the system.

Feeding conveyor 102 can be comprised of a series of individual corded belts. This is beneficial because less oil is transferred from the chip cooking area to seasoning system 100. As the chips leave the cooking area for subsequent seasoning, which is generally a fryer, motile oil remains on the chips and on the conveyor collecting the chips therefrom. Applying seasoning after cooking is advantageous because oil on the surface of chips helps retain seasoning. Furthermore, seasoning adhesion is improved at an elevated temperature that is within an optimal range wherein the seasoning adheres while not being degraded. As chips move away from the cooking area, oil on the chips is substantially adsorbed by the chips or dribbled off through open spaces between cords. Typically the cords are round so as to minimize the contact area of the conveyor with the chips. The cords can comprise any material that is suitable to withstand the operating conditions of snack chip manufacturing, such as polyurethane. To further minimize oil transfer, optional conveyor wiping with, for example, stationary wipers such as squeegees 104 and 106 can be utilized to clean the cords of conveyor 102. Pre-seasoning transfer is further detailed in discussion of FIGS. 2A and 2B below.

Another advantage of conveyor 102 is that the snack chips are easily maintained in a uniform and monolayer arrangement. This also allows the chips to be evenly placed upon conveyor 102 and, subsequently, evenly seasoned while maintaining a minimal void space between snack chips, preferably less than 50%. With a uniform and monolayer arrangement, snack chips that are substantially similarly shaped can be packaged in a container such as a cylinder with substantially each chip being seated against another.

Upon being conveyed to the seasoning area, snack chips are transferred from conveyor 102 to the chip conveyor 114. Conveyor 114 comprises a permeable surface so that seasoning not adhered to a snack chip may pass through for recovery. Preferably, round corded belts similar to conveyor 102 are utilized for conveyor 114 and maintain the uniform and monolayer arrangement. As the snack chips enter the seasoning area, they pass through a dust collector 110, which is a mode for preventing any airborne seasoning dust from escaping seasoning control room 112 and spreading out into the production plant. Seasoning control room 112 controls and regulates the temperature and humidity to minimize seasoning clustering. Generally, seasoning control room 112 has a positive pressure compared with the remainder of the facility. For example, a desired control environment for conventional seasonings occurs with a temperature less than about 70° F. and with a relative humidity of less than about 30%. Seasonings, which are comprised, in part, of moisture sensitive substances such as salt, sugars, and others, are less likely to cluster together in lower humidity conditions.

Once in seasoning control room 112, the snack chips are conveyed through a seasoning curtain 120. Seasoning curtain 120 is produced from a seasoning applicator 122 that is located above conveyor 114. Seasoning applicator 122 may comprise any mechanism for producing a steady and diffused stream of desired seasoning. One mechanism, for example, is one or more vibratory feeders whereby seasoning that is fed to each feeder is cascaded over snack chips passing beneath at a desired rate.

Seasoning that is not adhered onto moving snack chips passes through conveyor 114 and substantially accumulates upon a collecting apparatus such as seasoning recovery belt 130. Seasoning recovery belt 130 is a belt of sufficient width for substantially collecting the unused seasoning from seasoning curtain 120. As seasoning contacts the surface of belt 130, the seasoning comes to a rest upon the moving surface. While belt 130 is shown as being is essentially parallel to the top surface of conveyor 114, it should be understood that belt 130 may operate in an essentially perpendicular direction to that of top surface conveyor 114. Perpendicular operation allows for strategic placement and operation of belt 130 within seasoning system 100. Hence, the snack chips upon conveyor 114 are transported beneath seasoning applicator 122 and above seasoning recovery belt 130. In the embodiment shown, belt 130 rotates in a countercurrent direction to conveyor 114, however, concurrent rotation may be used. The recovered seasoning is dropped from the edge of belt 130 into a recycle seasoning collector 132. Optionally, any seasoning remaining on the surface of belt 130 after seasoning unloading into collector 132 can be significantly removed from belt 130 with a stationary wiper such as squeegee 131.

The reclaimed seasoning in seasoning collector 132 is directed toward a rotary sifter for purification. As shown, seasoning collector 132 is a funnel, but other transporting modes are possible, such as a vibratory feeder. Fresh seasoning from fresh seasoning silo 134 is fed and directed with vibratory feeder 136 toward entrance 137 of rotary sifter 138. The reclaimed seasoning from collector 132 is also supplied to entrance 137.

Fresh and reclaimed seasoning are then directed into rotary sifter 138. Rotary sifter 138 substantially removes unacceptable seasoning elements such as clumps of seasoning, broken chip pieces, and other undesirable matter. Seasoning clumps are formed from seasoning particles coagulating from exposure primarily with moisture, oil, or both. The unacceptable matter is passed through rotary sifter 138 and out exit 139. Therefrom, the unacceptable matter is collected in waste repository 140. Acceptable seasoning is passed through the filtration media of rotary sifter 138 and is collected in surge hopper 142. The seasoning collected in hopper 142 is a mixture of fresh and recovered seasoning that is mixed and suitable for sprinkling upon unseasoned snack chips.

While purifying and mixing is accomplished with rotary sifter 138 in the embodiment described herein, other techniques may be substituted such as planar screening with vibratory means. Rotary sifters, however, are desirable because they are efficient and are enclosed minimizing seasoning dust release into the environment. Alternatively, or additionally, fresh seasoning may be introduced to the reclaimed seasoning after sifting but additional blending may be required.

From hopper 142, the blended seasoning is transported via a pneumatic dense phase system transfer 144. A dense phase system transfer pump 143 provides an air stream for transporting seasoning from silo 142 toward vacuum receiver 146. While other transport techniques may be used for moving the blended seasoning toward seasoning applicator 122, dense phase system transfer 144 is preferred because dense phase transport is relatively gentle and preserves the blended composition of the mixture of fresh and recovered seasoning. Additionally, multi-component seasoning is comprised of seasonings having different densities and other physical properties that are sensitive to other transport techniques, such as dilute phase conveying. Pneumatic dense phase conveying utilizes wavelike-flow or plug-flow in transporting product through piping. This preserves the blended seasoning's composition.

With pneumatic dense phase transport, vibratory feeders, and environmental control, the physical properties of the seasoning are desirably maintained. Particularly, smearing of the intrinsic solid oil fraction of the seasoning is deterred. If augers, screws, or the like were used in conveying or metering the seasoning, the seasoning would experience physical degradation. It is preferable to minimize the volume of the recycled seasoning transport system. This is because the turnover rate is reduced allowing the use of a greater percentage of recycled seasoning as compared to fresh seasoning.

The blended seasoning is transported to vacuum receiver 146 for separating air from the seasoning. As the blended seasoning is received by the vacuum receiver 146, air from the mixture is drawn away via vacuum pump 147. The formerly entrained seasoning is gently directed toward vacuum receiver exit 148. From vacuum receiver exit 148, the blended seasoning is directed toward seasoning applicator hopper 150, which supplies blended seasoning to seasoning applicator 122. While this embodiment is shown with only one seasoning applicator, chip conveyor 114, and seasoning recovery belt 130, seasoning system 100 may be employed for handling the seasoning recovery and recycling for multiple assemblies.

Once seasoned, the snack chips exit seasoning control room 112 after being transferred to post-seasoning conveyor 154. Preferably, the seasoned snack chips exit control room 112 by passing through a dust collector 152 similar to dust collector 110. Thereby, the likelihood of seasoning dust being released into other parts of the manufacturing facilities is reduced. After snack chips are transferred from conveyor 114, optional set of stationary wipers such as squeegees 124 may be employed to remove any extraneous matter adhering to the cords of conveyor 114. Transport of the seasoned chips and cleaning of the cords after transfer is further detailed in discussion of FIG. 3 below. Conveyor 154, as with conveyors 102 and 114, is preferably comprised of round cords so as to maintain the seasoned snack chips uniform and monolayer arrangement. Thereby, the seasoned snack chips are transported to a packaging area for placement in a container such as a cylinder.

Figure 2A:
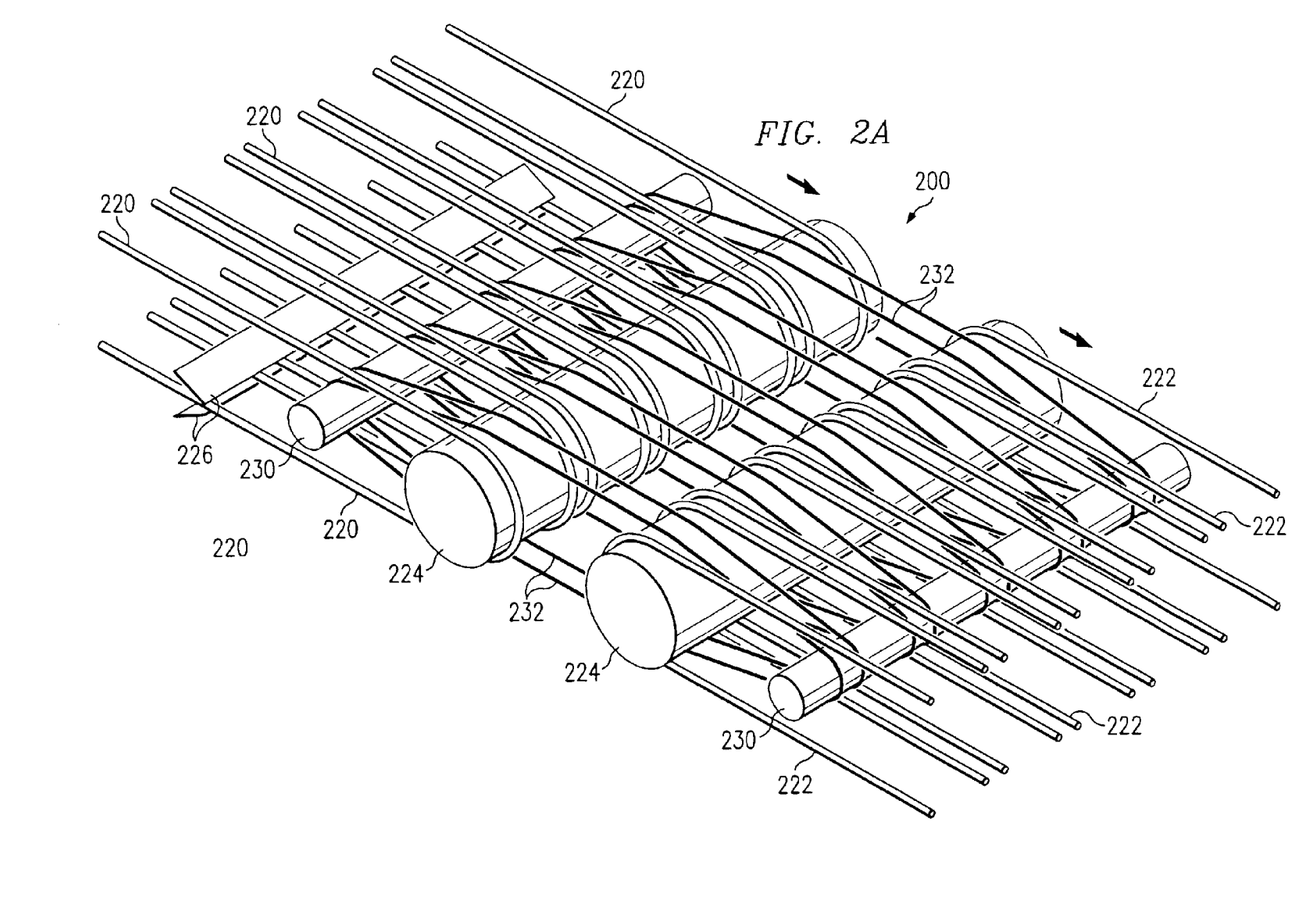
Figure 2B:
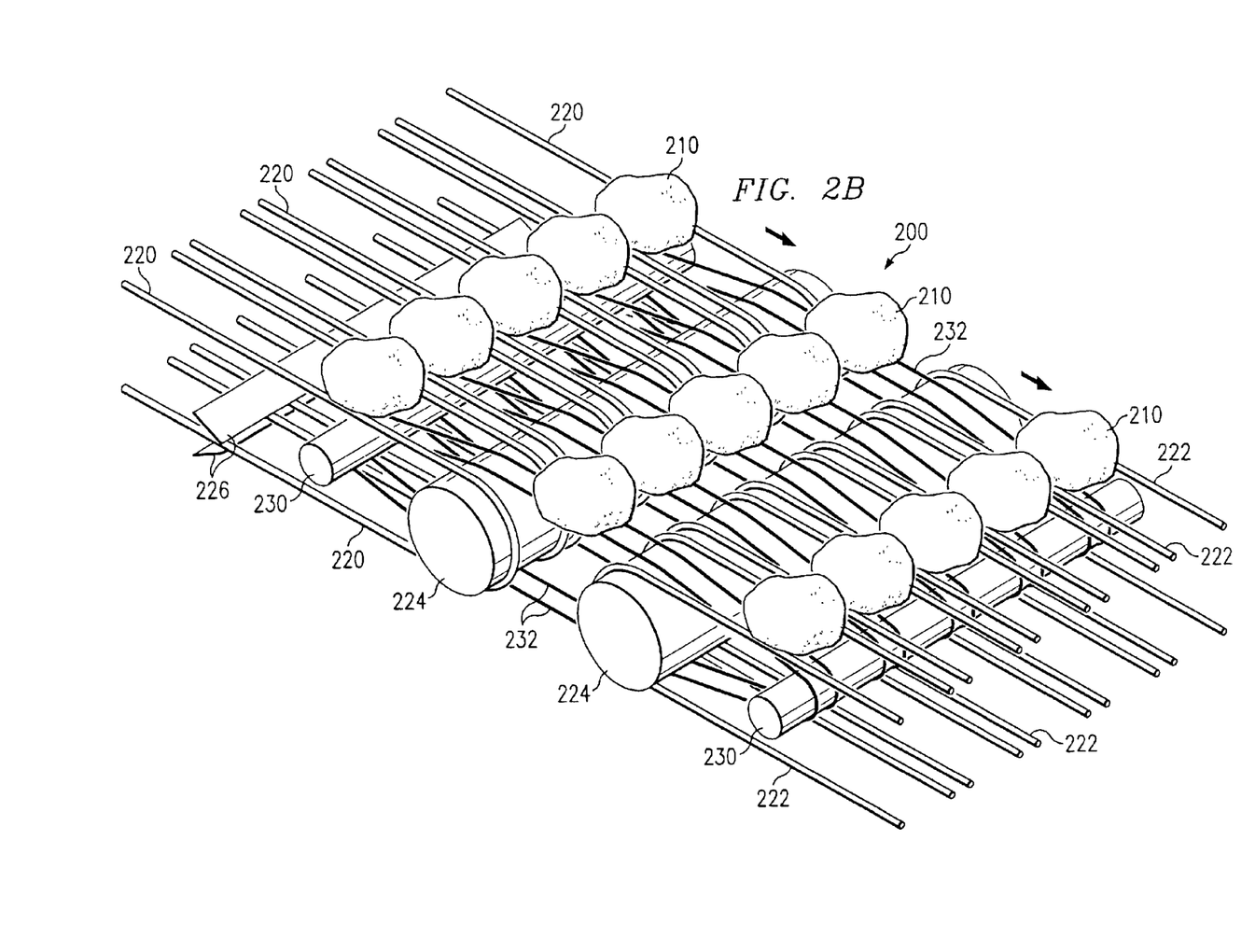

FIGS. 2A and 2B show a portion of conveyor 102 from FIG. 1 along line II—II. As stated above, this conveyor is for snack chip transport from a cooking area to a seasoning area. FIG. 2A shows conveyor assembly 200 from a top perspective view. FIG. 2B shows conveyor assembly 200 from a top perspective view with snack chips 210 being conveyed.

Therein, pre-seasoned cooked snack chips 210 are conveyed on round cords 220. As the cords are round, snack chips 210 maintain minimal contact with the surface of cords 220. Snack chips 210 are supported and suspended between at least two cords of conveyor assembly 200. To reduce unadsorbed oil transfer from, for example, a fryer of the cooking area, snack chips 210 are conveyed between at least two sets of cords shown here as cords 220 and 222. Cords 222 are of the same construction as cords 220. Rolls 224 are used to support both sets of cords 220 and 222.

To effect transfer of snack chips 210 from cords 220 to cords 222, transfer cords 232 are used. Preferably, the void area between snack chips 210 is reduced to minimize wasted seasoning. Transfer cords 232 are cords that operate between pairs of cords 220 and 222 that transports lanes of snack chips 210. In a preferred embodiment, at least two cords are configured to rotate between each pairs of cords 220 and 222. Rollers 230 support and rotate cords 232. One roller 230 is positioned just prior to the roller 224 supporting cords 220. The other roller 230 is positioned just after the roller 224 supporting cords 222. Generally, rollers 230 are smaller than rollers 224 and are positioned within the gap formed between the upper and lower segments of cords 220 and 222.

In operation, cords 232 rise up from roller 230 to commence support of passing snack chips 210. Cords 232 pass over the surface of each roller 224 and slant downward to the next roller 230. As they approach the first roller 224, the snack chips are lifted by chords 232. Cords 232 then convey the snack pieces until they begin to slant downward to roller 230, which deposits the snack chips 210 onto cords 222. Optionally, stationary wipers such as squeegees 226 may be used to remove any oil or other extraneous matter adhering to the cords of conveyor assembly 200.

Figure 3:
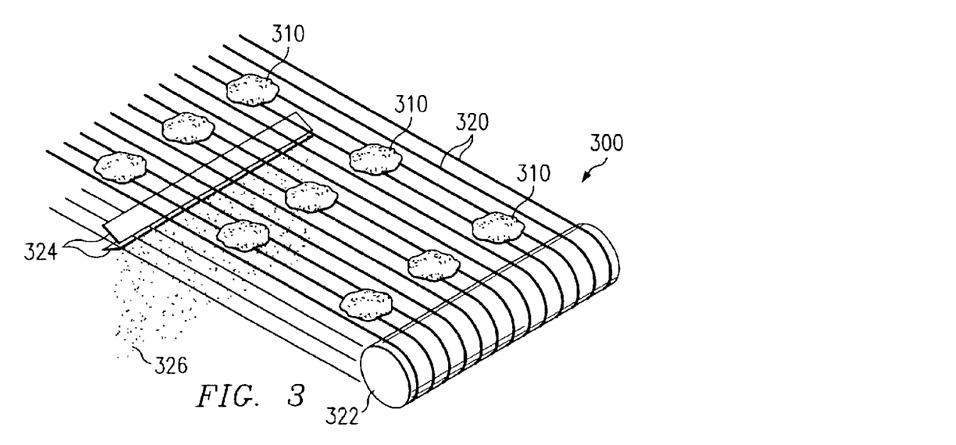
FIG. 3 is a partial side perspective view of an embodiment of a chip conveyor assembly located within the chip seasoning assembly for use with the apparatus and method of FIG. 1 along line 3—3.

FIG. 3 shows a portion of conveyor 114 from FIG. 1 along the line 3—3. Particularly, Seasoning chip conveyor assembly 300 shows seasoned snack chips 310 being transported after being seasoned toward packaging. Seasoned chips 310 are conveyed along round cords 320, which support the chips between at least two cords of conveyor assembly 300. At about roll 322 seasoned chips 310 are transferred to another conveyor (not shown). Extraneous matter 326 such as seasoning, chip particles, or oil may be removed with a set of stationary wipers such as squeegees 324. Extraneous matter 326 may then be discarded or directed towards recycling.

Figure 4:
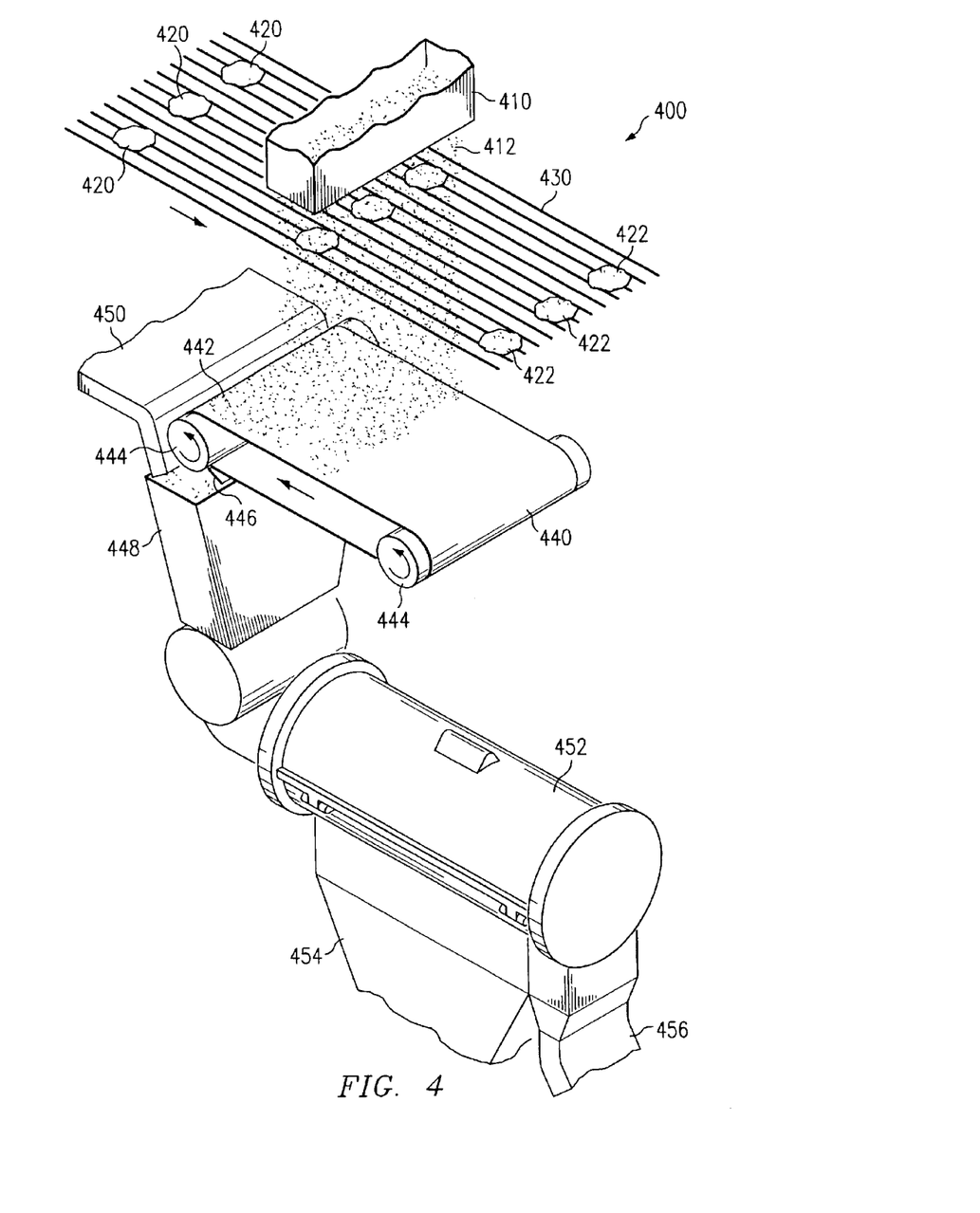
FIG. 4 is a schematic partial side elevational view of an embodiment of a chip seasoning assembly for use with the apparatus and method of FIG. 1 along line 4—4 showing seasoning application and recovery.

FIG. 4 shows a portion of seasoning application and recovery from FIG. 1 along line 4—4. Seasoning applicator and recovery 400 shows blended seasoning, which is a mixture of fresh and recycled seasoning, being applied onto snack chips. Particularly, seasoning applicator 410 produces a seasoning curtain 412. Seasoning curtain 412 is comprised of distributed seasoning particles falling from applicator 410 toward cords 430, which are similar to the cords of the conveyors described above. Cords 430 convey unseasoned snack chips 420 through seasoning curtain 412, which transforms snack chips 420 into seasoned snack chips 422.

The portion of seasoning curtain 412 that is not adhered to the surface of snack chips 420 or cords 430 is deposited upon a surface of seasoning reclaim belt 440, which is supported by rolls 444. While seasoning reclaim belt 440 is shown operating parallel to cords 430, reclaim belt 440 may operate perpendicularly. Reclaimed seasoning 442 is conveyed to a rotary sifter 452. After reclaimed seasoning 442 is deposited into entrance 448, optional stationary wipers, such as squeegee 446, assists in removing any seasoning adhering to the surface of belt 440 for directing into entrance 448. Along with reclaimed seasoning 442, fresh seasoning from fresh seasoning source 450 is introduced into entrance 448. Fresh seasoning is needed to provide a sufficient amount of seasoning for seasoning curtain 412 and to enhance overall flavor qualities of the blended seasoning.

The mixture of fresh and reclaimed seasoning is directed from entrance 448 into and through rotary sifter 452. Rotary sifter 452 is comprised of a rotating cylindrical screen (not shown) that uses centrifugal force to project acceptable and desirable seasoning therethrough to the blended seasoning exit 454. The seasoning and any other extraneous matter, which does not pass through the screen of rotary sifter 452, is directed to discards exit 456 for disposal. In addition to filtering, rotary sifter 452 also mixes and blends the fresh and reclaimed seasonings together to form blended seasoning. The blended seasoning may then be transported toward seasoning applicator 410. Additionally, other purification and blending techniques may be used, such as a vibratory screen, in addition to or as a replacement for rotary sifter 452.

Figure 5:
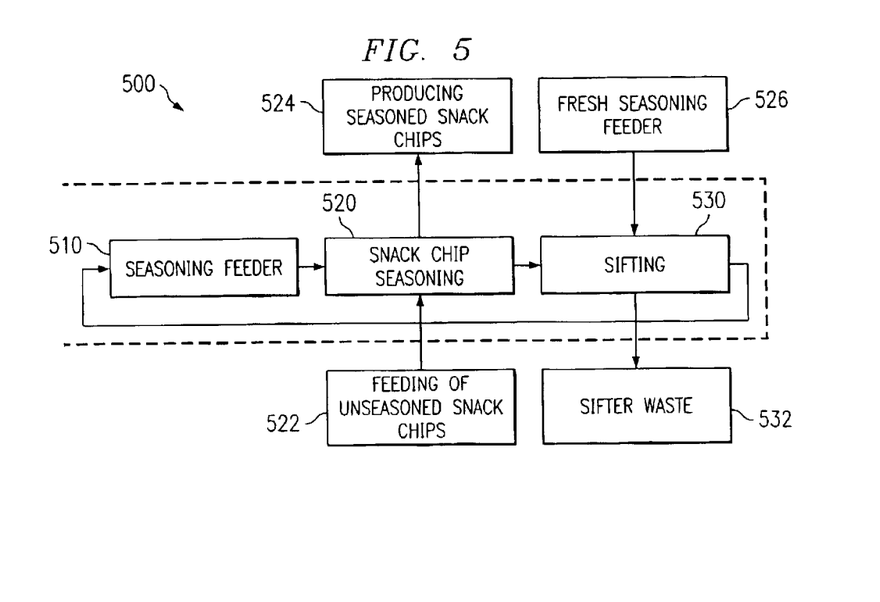
FIG. 5 is a schematic block diagram illustrating an exemplary process in accordance with the present invention for recovering and recycling seasoning.

FIG. 5 shows a schematic block diagram illustrating an exemplary process whereby seasoning for seasoning snack chips is recovered and recycled for reuse. Process 500 provides seasoning from seasoning feeder 510 to snack chip seasoning 520. Unseasoned snack chips from feeding of unseasoned snack chips 522 are seasoned in the snack chip seasoning 520 to produce the seasoned snack chips of producing seasoned snack chips 524. Chip seasoning 520 provides seasoning to producing seasoned snack chips 524 and to sifting 530. In addition to the reclaimed seasoning from chip seasoning 520, fresh seasoning feeder 526 adds fresh seasoning to the mixture to be sifted in sifting 530. Fresh seasoning feeder 526 provides seasoning replenishment to process 500. Acceptable and blended seasoning exits sifting 530 and is directed back to seasoning feeder 510. Unacceptable seasoning and any other extraneous matter are sent to sifter waste 532.

The seasoning recovery and recycle apparatus and process results in an efficient and economical way to apply recovered seasoning, particularly to snack chips being conveyed in monolayer arrangement. Further, seasoning applied but not adhered to snack chips can be reused while maintaining the physical properties desired for seasoning such as flowability, particle size, flavor, and color while avoiding microbiological issues. Another advantage of the apparatus and process described herein is that residual oil and water transfer into the seasoning is minimized due to, at least in part, the corded conveyor system. Also, handling of the seasoning by the seasoning recovery and recycle apparatus is gentle, which helps to preserve the quality of the recycled seasoning and avoids the creation of dust.

While the invention has been particularly shown and described with reference to a preferred embodiment, it will be understood by those skilled in the art that various changes in form and detail may be made therein without departing from the spirit and scope of the invention.

What is claimed is:

1. A seasoning apparatus for reclaiming seasoning and for applying seasoning onto snack chips, comprising:
   a seasoning permeable conveyor for transporting snack chips through a seasoning application;
   a seasoning applicator for depositing seasoning onto snack chips being transported on the conveyor;
   a seasoning recoverer positioned beneath the seasoning applicator and the conveyor;
   a sifter for receiving and purifying recovered seasoning from the seasoning recoverer;
   a fresh seasoning feeder for adding seasoning to the recovered seasoning to produce a blended seasoning; and
   a blended seasoning transporter for transferring the blended seasoning to the seasoning applicator for application onto the snack chips.

2. The seasoning apparatus of claim 1 wherein the seasoning permeable conveyor further comprises multiple segments of round cords, each segment having at least two or more concurrent cords with an open space disposed between.

3. The seasoning apparatus of claim 2 wherein the cords are comprised of polyurethane.

4. The seasoning apparatus of claim 2 wherein the cords of each segment that are disposed for transfer to an adjacent segment of cords are provided with a set of transfer rollers and transfer cords to effect transport of the snack chips from each segment of cords to another.

5. The seasoning apparatus of claim 4 wherein transporting forward of cooking oil, broken snack chip pieces, seasoning, or other extraneous matter is reduced.

6. The seasoning apparatus of claim 1 wherein the seasoning applicator includes a seasoning room having controlled temperature and humidity.

7. The seasoning apparatus of claim 1 wherein the seasoning applicator includes a seasoning room having dust removers disposed about a conveyor entrance and conveyor exit.

8. The seasoning apparatus of claim 1 wherein the seasoning applicator provides a curtain of seasoning from above the snack chip conveyor.

9. The seasoning apparatus of claim 1 wherein the seasoning recoverer collects seasoning that passes through and by the conveyor and snack chips.

10. The seasoning apparatus of claim 9 wherein the seasoning recoverer is a rotating belt.

11. The seasoning apparatus of claim 9 wherein the seasoning recoverer is a vibratory screen.

12. The seasoning apparatus of claim 1 wherein the sifter receives the fresh and recovered seasoning for simultaneous purifying and blending.

13. The seasoning apparatus of claim 12 wherein the sifter is a rotary sifter.

14. The seasoning apparatus of claim 1 wherein the blended seasoning transporter is a pneumatic dense phase system transporter.

15. The seasoning apparatus of claim 14 wherein a vacuum receiver receives the blended seasoning from the dense phase system transporter and provides the blended seasoning to the seasoning applicator.

16. A seasoning process for reclaiming seasoning and for applying seasoning onto snack chips, comprising:
conveying snack chips on a seasoning permeable conveyor;
applying seasoning onto snack chips on the conveyor;
recovering seasoning that passes through and by the conveyor and snack chips to produce recovered seasoning;
purifying recovered seasoning to remove undesirable matter;
adding fresh seasoning to the recovered seasoning to create a mixture of blended seasoning; and
transporting blended seasoning to the seasoning applicator.

17. The seasoning process of claim 16 wherein the adding fresh seasoning to recovered seasoning is performed prior to the purifying of recovered seasoning.

18. The seasoning process of claim 16 wherein the conveying of snack chips further comprises positioning the snack chips in a monolayer arrangement on a conveyor having multiple segments of round cords, each segment having at least two or more concurrent cords with an open space disposed between.

19. The seasoning process of claim 18 further comprising interlacing the cords and the spaces of a segment with the cords and spaces of each succeeding or preceding segment.

20. The seasoning process of claim 18 wherein the conveying reduces a transporting forward of cooking oil, broken snack chip pieces, seasoning, or other extraneous matter.

21. The seasoning process of claim 16 wherein the applying of seasoning includes a seasoning room having controlled temperature and humidity.

22. The seasoning process of claim 16 wherein the applying of seasoning further comprises providing a curtain of seasoning from above the conveyor.

23. The seasoning process of claim 16 wherein the recovering of seasoning further comprises collecting the seasoning upon a rotating belt positioned beneath the conveyor.

24. The seasoning process of claim 17 wherein the purifying further comprises feeding the fresh and recovered seasoning to a sifter for simultaneous blending and removing of undesirable matter.

25. The seasoning process of claim 24 wherein the sifter is a rotary sifter.

26. The seasoning process of claim 16 wherein the transporting of the blended seasoning further comprises utilizing a pneumatic dense phase system transporter.

27. The seasoning process of claim 26 wherein the transporting of the blended seasoning further comprises receiving the blended seasoning in a vacuum receiver.

* * * * *